United States Patent [19]

Denker

[11] 3,893,874

[45] July 8, 1975

[54] CAMS

[75] Inventor: James M. Denker, Scituate, Mass.

[73] Assignee: Nutron Corporation, Hingham, Mass.

[22] Filed: Apr. 25, 1974

[21] Appl. No.: 464,135

Related U.S. Application Data

[62] Division of Ser. No. 327,651, Jan. 29, 1973, Pat. No. 3,848,481.

[52] U.S. Cl. ............ 148/12.1; 148/12.4; 148/15.5; 148/16.5; 148/19; 148/39; 148/145; 148/148; 148/152

[51] Int. Cl. ...... C21d 1/00; C21d 1/06; C23d 11/12

[58] Field of Search .......... 148/12, 12.1, 12.4, 15.5, 148/16.5, 19, 39, 145, 148, 150, 151, 152

[56] References Cited
UNITED STATES PATENTS

| | | | |
|---|---|---|---|
| 340,156 | 4/1886 | Richards | 74/567 X |
| 475,379 | 5/1892 | Baker | 74/567 X |
| 1,353,368 | 9/1920 | Williams | 74/567 X |
| 2,202,759 | 5/1940 | Denneen et al | 148/148 |
| 2,207,289 | 7/1940 | Fleischmann | 148/16.5 |
| 2,368,007 | 1/1945 | Delahan et al | 148/12.1 X |
| 2,590,546 | 3/1952 | Kincaid et al | 148/148 X |
| 2,729,117 | 1/1956 | Maybach et al | 74/596 |
| 3,058,369 | 10/1962 | Vogel | 74/567 X |
| 3,216,869 | 11/1965 | Koistinen | 148/152 X |
| 3,477,884 | 11/1969 | Schlicht | 148/152 X |

OTHER PUBLICATIONS

Rothbart, H. A., Cams, John Wiley and Sons Inc. N.Y., 1956 pgs. 275-282 TJ206 R6 C.2.

Primary Examiner—C. Lovell

[57] ABSTRACT

A longitudinally-extending cam track made by case-hardening a cam to provide a case-hardened layer of substantially uniform thickness in transverse cross-section underlying and defining a surface of the cam, and then removing a central longitudinally-extending portion of the layer to form the cam track, the remaining portions of the layer defining portions of the cam track and being of greater thickness along the sides of the track.

10 Claims, 7 Drawing Figures

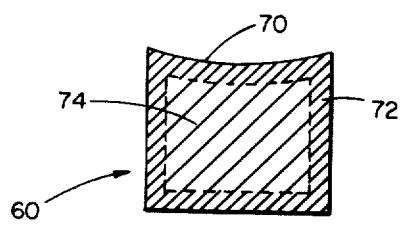
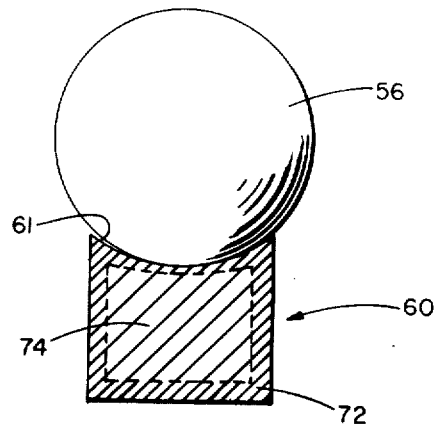
FIG. 2A     FIG. 2B
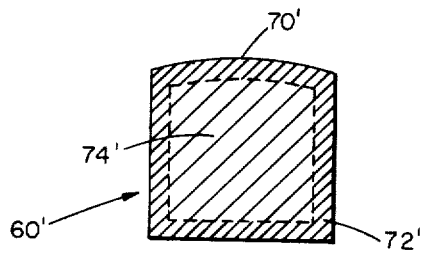
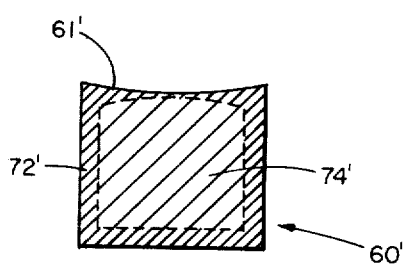
FIG. 3A     FIG. 3B
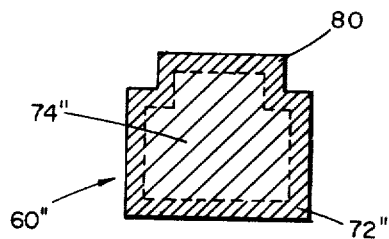
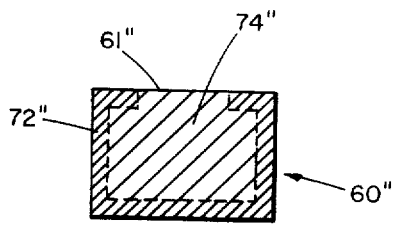
FIG. 4A     FIG. 4B

CAMS

This application is a division of Ser. No. 327,651, filed Jan. 29, 1973, now U.S. Pat. No. 3,848,481.

This invention relates to cams.

It is a primary object of the present invention to provide an inexpensive undulating cam track having a greatly increased load carrying capacity. Other objects include providing multi-cycle cams, especially useful in rotary fluid pumps and motors, which are finally contoured during motor operation without destruction of their necessary configuration.

The invention features a longitudinally-extending cam track made by case-hardening a cam to provide a case-hardened layer of substantially uniform thickness in transverse cross-section underlying and defining a surface of the cam, and then removing a central longitudinally-extending portion of the layer to form the cam track, the remaining portions of the layer defining portions of the cam track and being of greater thickness along the sides of the track. In preferred embodiments in which the central portion of the track is defined by unhardened material or by a thin layer of case hardened material, the cam is initially formed with the surface of greater curvature, in transverse cross-section, than the cam track and the thickness of the case-hardened layer defining the sides of the track is not less than on the order of an order of magnitude greater than that of any case-hardened material at the track center.

Other objects, features, and advantages will appear from the following detailed description of preferred embodiments of the invention, taken in conjunction with the attached drawing, in which:

FIGS. 2A and 2B are cross-sectional views of the cam of the motor of FIG. 1 at two stages of the manufacture thereof; and, FIGS. 3A, 3B, and 4A and 4B are cross-sectional views of, respectively, two other cams embodying the present invention, each at two stages of the manufacture thereof.

Figure 1:
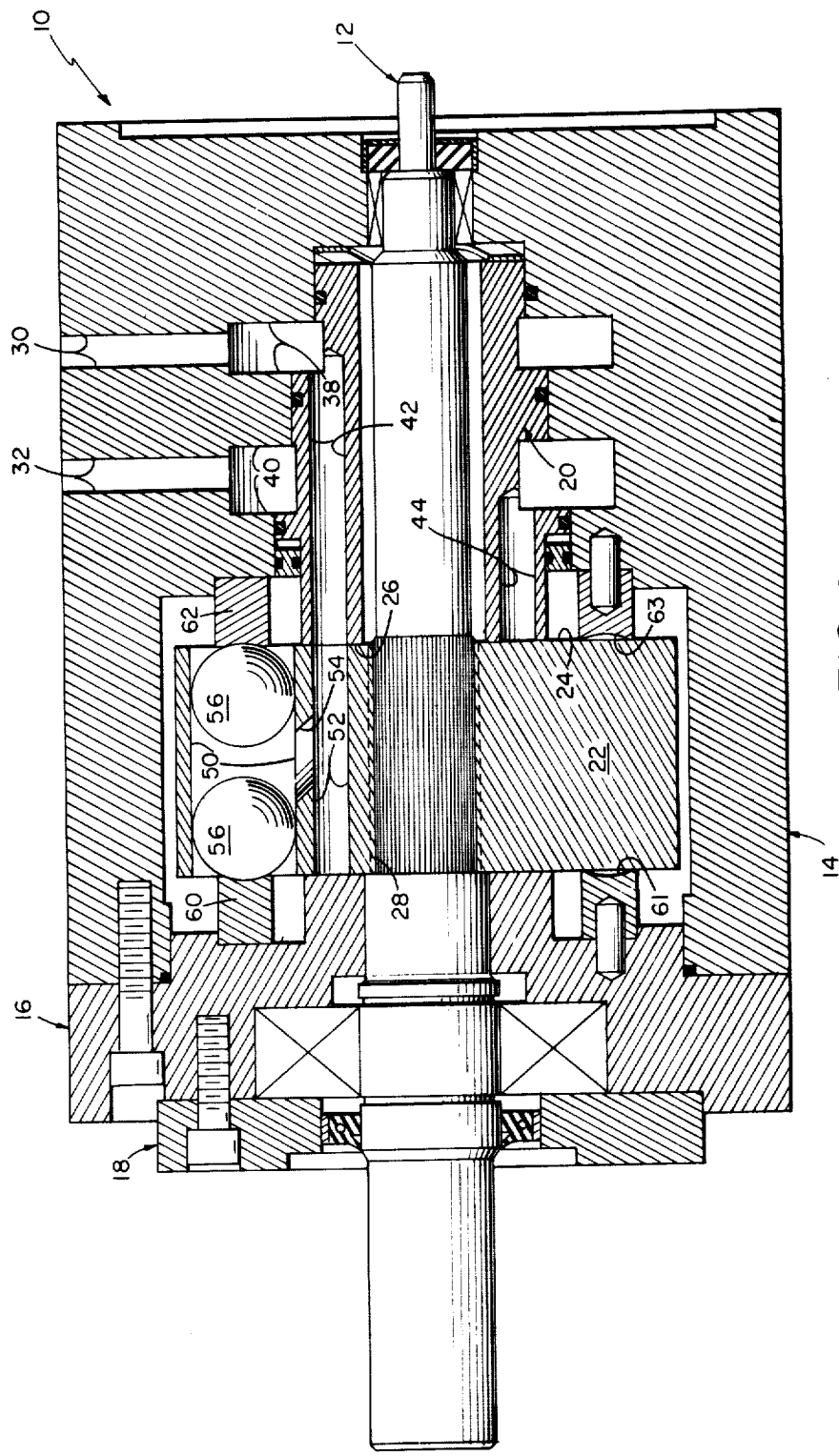
FIG. 1 is a longitudinal cross-sectional view of a rotary fluid motor including a cam constructed in accordance with the present invention.

Referring more particularly to the drawings, there is illustrated a rotary fluid motor, generally designated 10, comprising an output shaft 12 extending coaxially through a multi-part housing including, in coaxial alignment, a cylindrical main housing 14, a cylindrical support housing section 16, and an end plate 18. The construction of motor 10 is illustrated in detail, in my U.S. Pat. No. 3,662,551, issued on May 16, 1972, which is hereby incorporated by reference, and will be described but briefly herein.

A stepped cylindrical fluid distribution manifold 20 and rotor 22 are mounted within annular cavities within main housing 14 and surrounding shaft 12. One axial face 24 of rotor 22 is in face-to-face engagement with the adjacent face 26 of manifold 20. Rotor 22 is fixed on shaft 12 for rotation therewith by spline 28.

Main housing 14 includes drilled inlet and outlet drain conduits, designated 30 and 32 respectively, extending through the wall of the main housing section. The outer portion of each conduit is tapped for receiving a fluid coupling. A pair of axially spaced, radially inwardly facing annular channels 38, 40 are provided in housing section 14 at the periphery of manifold 20. Inlet conduit 30 communicates at its inner end with channel 38 and outlet conduit 32 communicates at its inner end with channel 40.

A total of six drilled conduits 42, arranged in a ring and spaced at regular 60° intervals therearound extend axially within manifold 20 from surface 26 to channel 38. A total of six additional drilled conduits 44, extending axially within manifold 20 from surface 26 to channel 40, are provided in the ring, spaced midway between adjacent ones of conduits 42.

Rotor 22 includes a total of ten cylindrical bores 50 and 10 cylindrical conduits 52 (arranged in a ring within the rings of bores 50) extending axially through the full thickness of the rotor. A drilled conduit 54 extends from each conduit 52 to the bore 50 aligned therewith. Two steel balls 56 are fitted within each of bores 50 for movement within the bore.

An annular wave cam 60, 62 including circular undulating ball-engaging surface 61, 63 is mounted on each axial side of rotor 22, coaxially therewith, with the ball-engaging surfaces or tracks 61, 63 of each cam engaging one of the balls 56 in each bore 50. Each track 61, 63 is a trapezoidal acceleration cam surface comprising alternating parabolic and intermediate fairing sections. The period of the cam is 60° (that is, each entire annular track includes 6 substantially identical complete cycles each having one high point or peak and one low point or valley) and its total amplitude (peak-to-valley) is slightly less than one-half the diameter of balls 56.

In operation, fluid is introduced into the motor at high pressure through conduit 30, and exits from the motor at low pressure through conduit 32. A power stroke of the balls 56 within a bore 50 commences when the balls engage a crest or high point of the cam tracks 61, 63 of wave cams 60, 62 and, therefore, are in their nearest relative position. With the balls in this position, high pressure fluid from inlet conduit 30 passes from the inlet through annular channel 38, conduits 42 of manifold 30, and rotor conduits 52, 54 into the bores 50, thereby forcing the balls within the bore away from each other against the tracks 61, 63 of wave cams 60, 62. The force of the balls against the ball-engaging surfaces imparts a torque to, and causes rotation of, the rotor 22. As the rotor rotates, balls 56 roll down the slopes of the ball-engaging surfaces with which they are in contact, the balls within each bore 50 thereby moving apart. When, after 30° rotation of rotor 24, the balls have reached their most distant relative position, the port of conduit 52 moves out of communication with conduit 42 and into communication with adjacent conduit 44 in manifold 20. Conduit 44 is connected, through channel 40, to low pressure fluid outlet conduit 32. During the next 30° rotation of rotor 22, balls 56 roll up the slope of the tracks 61, 63 thereby moving together and discharging fluid from the bore 50 into the outlet.

The power produced by motor 10 depends in large measure on the force with which the fluid in bores 50 drives the balls 56 outwardly against cams 60, 62. Greater force results in a larger power output, but the maximum force that can be applied is limited by the load-carrying capacity of the piston-track contact area.

In devices using ball pistons, one method of increasing the load-carrying capacity has been to contour the track to the ball piston, so that the area of contact, under load, between the ball and track will be elliptical, the major axis of ellipse being transverse to the direction of relative movement of the ball along the cam track. This method is especially useful with simple cams of soft (low yield point) material. The material will undergo plastic deformation at relatively low stress, and the force of the balls against the track will plastically deform any areas of localized high stress, and conform the track to the ball. Such deformation is very useful in smoothing out minor manufacturing flaws. However, it will also flatten the peaks (high points) of undulating or multi-cycle cam tracks, thereby destroying their basic necessary configuration.

A second method of increasing load-carrying capacity, which has been useful with multi-cycle cams, is to raise the yield point of the material defining and underlying the cam track by case-hardening, thereby providing a hard (high yield point) case-hardened layer of substantially uniform thickness underlying the cam track surface. As case-hardened material will not yield plastically, the problems of deformation inherent in soft multi-cycle cams are eliminated. However, lack of plastic deformation also requires that the track, as manufactured, be perfectly contoured to the ball with which it will be used, a difficult and expensive procedure. If contour is not perfect, the ball-track contact area will be relatively small and the force of the piston against the track will create localized destructive stresses in excess of the case-hardened material's yield point.

Cams constructed according to the present invention combine the advantages, and eliminate the drawbacks, of both these methods by providing a case-hardened layer of conventional thickness underlying the sides of the finished cam track, but only a very thin case-hardened layer, or no case-hardened layer at all, underlying the central portion of the track which defines most or all of the surface actually contacted by the ball pistons. Such cams are manufactured by case-hardening an unfinished cam to form a case-hardened layer or shell of substantially uniform thickness overlying an unhardened core at the surface that will eventually define the finished cam track, and then removing a portion of the case-hardened layer to form the finished track. The exact shape of the original cam will depend on the desired configuration of the finished track, which in turn depends on the radius of the ball to be used therewith. The unfinished cam is initially formed with the surface thereof which will eventually define the finished longitudinally-extending track having a greater curvature, in transverse cross-section, than that of the finished track. The curvature of a surface, of course, is equal to 1/R, where R is the radius of curvature of the surface, and R is positive or negative depending on whether the vector from the surface to the center of curvature extends into or away from the solid body defining the surface. Thus, a convex surface has positive curvature; a concave surface, negative. The curvature of flat surface is zero, its radius of curvature being infinite.

As shown in FIG. 2A, cam 60 is initially rough formed with the annular surface 70 thereof which eventually will define cam track 61 defining a rough cam track having the same number of cycles or undulations as will track 61.

In transverse cross-section, the curvature of surface 70 is about —3.2/in. (concave with R of about 5/16 inch); that of finished track 61 (FIG. 2B) is slightly less than —4.0/in. (for use with balls of 0.500 in. diameter).

After rough forming, cam 60 is case-hardened, in any conventional manner, to form a case-hardened layer 72, on the order of 0.010 inch to 0.020 inch thick, surrounding a central unhardened core 74.

To form the finished cam track 61, a major portion of the case-hardened layer is removed, using conventional machining techniques and cutters of lesser radius of curvature than surface 70. Typically, the major machining is done with a ball mill of slightly smaller radius than finished track 61, and final finishing is accomplished with a band grinder. After finishing, the thickness of the case-hardened layer underlying track surface 61 varies from a minimum of 0.001 inch to 0.002 inch, at the center of the track, to almost the original thickness of layer 72, 0.010 inch to 0.020 inch, under the track sides. The radius of curvature of the finished track is slightly greater than that of balls 52.

In operation, balls 56 are forced against and roll along cam surface 61, generally centered thereon. The pressure of the balls plastically deforms the unhardened core material under the thin case-hardened material along the center of the track, thereby providing the desired elliptical contact area. The thin case-hardened layer elastically deforms, acting as a sort of cover for the underlying plastically deformed soft material. The thick case-hardened layers along the sides of the track elastically deform, but resist destructive plastic deformation of the basic multi-cycle cam configuration.

Reference is now made to FIGS. 3A, and 3B, and 4A and 4b, which illustrate slightly modified processes for manufacturing cams of the present invention.

As shown in radial cross-section in FIG. 3A, cam 60' is initially rough-formed with the annular surface 70' thereof which will eventually form the finished cam track surface 61' (FIG. 4B) having, in radial transverse cross-section, a slight positive (convex) curvature. The rough cam 60'' shown in FIG. 4A is initially formed with a radially projecting flange 80 projecting upwardly from the center of annular surface 70''. Each rough cam is then case-hardened to form a case-hardened layer, 72', 72'' respectively, surrounding a respective unhardened core 74', 74''.

To finish cam 60', a portion of the case-hardened layer 72' underlying surface 70' is removed, using conventional machining techniques. A ball mill and band grinder may be employed as previously discussed with reference to cam 60 to form the concave finished cam surface 61' (negative curvature) shown in FIG. 3B. If desired, a flat finished cam track (zero curvature) may also be formed. In either case, enough of case-hardened layer 72' is removed so that the thickness of the remaining case-hardened material will be very thin (or perhaps zero) at the center of the finished cam surface, and will be almost as thick as the original layer along the track edges.

To finish cam 60'', flange 80 is removed, using a conventional mill and/or grinder to form the flat finished track 61'', shown in FIG. 4B, which is defined at its center by unhardened material of core 70'' and along its edges by case-hardened layer 72''. Of course, the finished cam track 61'' may also have a convex configuration similar to tracks 61 and 61'.

Other embodiments within the scope of the following claims will occur to those skilled in the art.

What is claimed is:

1. The method of making a longitudinally-extending cam track including the steps of:

case-hardening a cam to provide a case-hardened layer of relatively high yield point material overlying a core of relatively low yield point material, said layer being of substantially uniform thickness in transverse cross-section and underlying and defining a surface of the cam; and, removing a central longitudinally-extending portion of said layer to form said cam track, the remaining portions of the layer defining portions of said cam track and being of greater thickness along the sides than along the center of the track.

2. The method of claim 1 wherein a remaining portion of said layer of thickness substantially less than that of said portions along the sides of said track underlies and defines the center of said track.

3. The method of claim 2 wherein said remaining portions underlying and defining said track are continuous and vary in thickness across the transverse width thereof.

4. The method of claim 2 wherein the thicknesses of said portions along said sides are on the order of 0.020 inch to 0.010 inch and the thickness of said portion defining the center of said track is less than 0.005 inch.

5. The method of claim 4 wherein said thickness of said portion defining the center of said track is on the order of 0.002 inch to 0.001 inch.

6. The method of claim 1 wherein the central portion of said track is defined by a portion of said core, said portion of said core being exposed by said removal.

7. The method of claim 1 wherein said surface has in transverse cross-section a curvature greater than the curvature of said cam track.

8. The method of claim 7 wherein said curvature of said surface is positive and said curvature of said track is not greater than zero.

9. The method of claim 7 wherein the curvatures of said surface and said track are both not greater than zero, the curvature of said track being less than that of said surface.

10. The method of claim 7 wherein said surface is defined in part by an upwardly projecting rib and including the step of removing said rib to form said track.

* * * * *